United States Patent [19]

Inoue et al.

[11] 4,456,381

[45] Jun. 26, 1984

[54] CLOSED TYPE MIXING/KNEADING APPARATUS

[75] Inventors: Kimio Inoue, Kobe; Tsugushi Fukui, Miki; Toshihiro Asai, Kobe; Kazuhiko Nakagawa, Kobe; Akimasa Kuriyama, Kobe, all of Japan

[73] Assignee: Kabushiki Kaisha Kobe Seiko Sho, Kobe, Japan

[21] Appl. No.: 234,607

[22] Filed: Feb. 17, 1981

[30] Foreign Application Priority Data

Feb. 16, 1981 [JP] Japan ................... 55-18335

[51] Int. Cl.$^3$ ............................................. B01F 7/02
[52] U.S. Cl. ......................................... 366/97; 366/300
[58] Field of Search ................ 366/83, 97, 98, 99, 366/300, 84; 425/208, 209

[56] References Cited

U.S. PATENT DOCUMENTS

| 1,369,080 | 2/1981 | Bowen | 366/99 |
| 1,406,666 | 2/1922 | Lohmann | 260/816 R |
| 1,787,507 | 1/1931 | Bowen et al. | 366/99 |
| 3,403,894 | 10/1968 | Matsuoka et al. | 366/97 |
| 3,565,403 | 2/1971 | Matsuoka | 366/84 |
| 3,610,585 | 10/1971 | MacLeod et al. | 366/300 X |
| 3,764,118 | 10/1973 | Matsuoka | 366/84 |
| 3,829,067 | 8/1974 | Matsuoka | 366/81 |
| 4,084,263 | 4/1978 | Millauer | 366/84 |
| 4,234,259 | 11/1980 | Wiedmann et al. | 366/81 |
| 4,300,838 | 11/1981 | Sato | 366/84 |

FOREIGN PATENT DOCUMENTS

| 2429088 | 6/1979 | France . |
| 1340244 | 12/1973 | United Kingdom . |
| 2024635 | 6/1979 | United Kingdom . |
| 2028153A | 3/1980 | United Kingdom . |

Primary Examiner—Stephen Marcus
Assistant Examiner—Joseph M. Pitko
Attorney, Agent, or Firm—Oblon, Fisher, Spivak, McClelland & Maier

[57] ABSTRACT

Disclosed is a closed type mixing and kneading apparatus with two juxtaposed double-wing rotors providing increased mixing and increased shearing action. One of the wings of each rotor has a length ratio of 0.6 to 0.9 relative to the total length of the rotor at a twist angle of 10° to 40°. The two wings of each rotor are overlapped by between 0.2 and 0.8 times the total length of the rotor.

6 Claims, 15 Drawing Figures

CLOSED TYPE MIXING/KNEADING APPARATUS

BACKGROUND OF THE INVENTION

1. Field of the Invention

This invention relates to an improvement in closed type mixing/kneading machines.

2. Description of the Prior Art

A closed type mixing/kneading machine is a batch type mixer suitable for kneading rubber and other plastic materials and is particularly indispensable in the tire manufacturing industry for mastication of rubber (kneading for plasticization) or for carbon master batch kneading or blending vulcanizing chemicals.

Closed type mixers usually employ a pair of double-wing rotors 1 each having a long blade 2 and a short blade 3 as shown in FIG. 1 or a pair of four-wing rotors each having two long wings 2 and two short wings 3 as shown in FIG. 2. A charged material 5 is subjected to a high shearing action and undergoes strong plasticization upon passage through a narrow clearance (tip clearance) between the tip 6 of the rotor and a mixer barrel 4 (as shown in FIGS. 3 through 6) simultaneously with micro-dispersion of additives. On the other hand, the wings of each rotor are twisted in a direction of pushing the material toward the center of the barrel as indicated by arrows in FIGS. 1 and 2, and the two rotors are rotated at a predetermined speed ratio. Due to such rotor construction and the rotational speed ratio between the two rotors, the material is mixed by repeated folding and reversing actions to advance the homogenization of the material and micro-dispersion of additives. Thus, the mixing and kneading actions of the closed type mixer/kneader consist of a combination of shearing and mixing actions.

Upon comparing the double and four-wing rotors, the four-wing rotor, which has twice the number of tips as does the double-wing rotor, has a higher shearing action and is capable of attaining plasticization or micro-dispersion of additives in a shorter time period. On the other hand, the double-wing rotor with a smaller number of tips leaves a greater space in the mixing chamber than the four-wing rotor and is therefore advantageous for smooth movement and homogenization of the mixing material as well as for the micro-dispersion of additives. Namely, the four-wing rotor puts an emphasis on the shearing action while the double-wing rotor emphasizes the mixing action. For instance, the four-wing rotors are suitable for the mastication of natural rubber and carbon master batch kneading, while the double-wing rotors are suitable for the dispersion of vulcanizing agents or other chemicals (pro-kneading).

The above-mentioned kneading characteristics unique to the respective rotor constructions can be an advantage or a detriment depending upon the circumstances. Especially, in the current rubber industry, it is difficult to cope with the hardening or softening of the material due to inclusion of a large quantity of filler or oil by the use of one set of double or four-wing rotors.

SUMMARY OF THE INVENTION

The present invention has as an object the solution of the above-mentioned problem of the prior art.

It is a more particular object of the present invention to provide a double-wing rotor for a closed type mixer/kneader, which has the high micro-dispersing power (mixing action) inherent to the double-wing rotor along with a plasticizing power (shear action) comparable to that of the four-wing rotor, and which is thus capable of handling a wide range of materials.

According to the present invention, there is provided a closed type mixing and kneading apparatus having within a mixing chamber a pair of juxtaposed double-wing rotors, each one of the rotors having the respective wings twisted to move a charged material inward from one end of the mixing chamber. One of the wings of each rotor has a length of from 0.6 to 0.9 relative to the total length of the rotor and a twist angle of 10°–40°, and two wings overlap one another by between 0.2 and 0.8 of the total length of the rotor.

BRIEF DESCRIPTION OF THE DRAWINGS

The above and other objects, features and advantages of the present invention will become apparent from the following description and the appended claims, taken in conjunction with the accompanying drawings which show by way of example preferred embodiments of the present invention.

DETAILED DESCRIPTION OF THE PREFERRED EMBODIMENTS

A closed type mixing and kneading machine employs a pair of juxtaposed rotors which are rotatable in opposite directions and are each accommodated in a cylindrical barrel with cooling or heating means. The barrels are connected to each other along the lengths thereof and interiorly define mixing chambers which are intercommunicated through a connected or joint portion. A feed material which is charged through a hopper provided in the intercommunicating joint portion is forced into the mixing chambers by the biting action of the rotating rotors and the pushing action of a floating weight (not shown) provided in the hopper opening, undergoing shearing and mixing actions provided by the two rotors within the respective mixing chambers for uniform plasticization of the material and for micro or macro-dispersion of additives. The shearing action occurs mainly between the tips of the rotor wings and the walls of the mixing chambers, to a greater degree with longer wings or with a greater number of wings. On the other hand, the mixing action is interrelated in a complex manner with the form, twist angle and length of the wings, and with the ratio of rotational speed between the two rotors. The degree of mixing is dictated by how quickly the material is moved through the respective mixing chambers without stagnation in one particular locality. Extensive use and research of the closed type mixers has revealed that it is necessary to provide in the mixing chambers an area where the movement of material easily takes place, or to increase the flow rate and the length of movement of the material which is pushed axially along the blades. With these considerations in view, theoretical studies were conducted with regard to the shape and formation of double-wing rotors capable of producing the excellent mixing action inherent in the double-wing rotors as well as actions akin to those provided by four-wing rotors, as follows.

Figure 7:
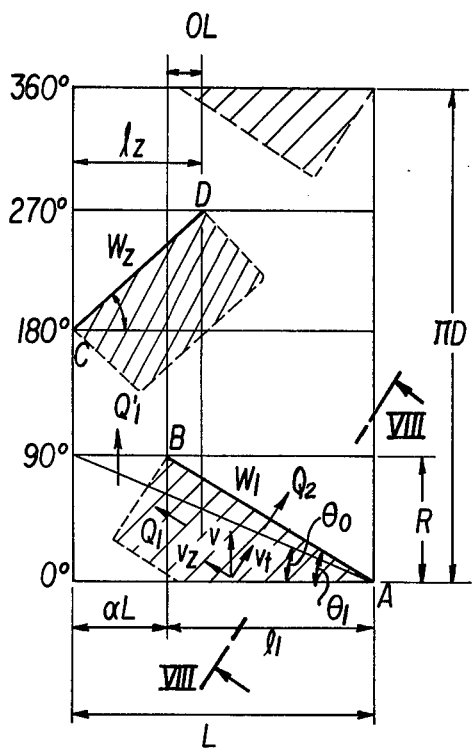
FIG. 7 is a developed view showing the relation between a double-wing rotor and its barrel.
Figure 8:
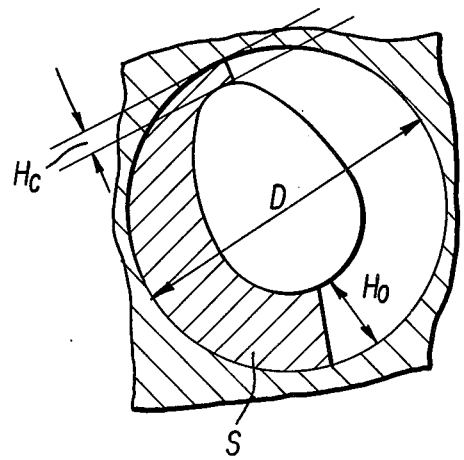
FIG. 8 is a sectional view taken along line VIII—VIII of FIG. 7.

Reference is now made to FIGS. 7 and 8 which illustrate in developed and sectional views a double-wing rotor in a mixing operation. In these figures, the hatching indicates a region which is filled with the mixing material. According to the blade formation on the conventional double-wing rotor, the wing is twisted in such a manner as to move the material toward the center of the rotor, with the initial points A and C of opposite wings being shifted 180° from each other in phase. The arrangement in which the point B of the wing $W_1$ is shifted 90° from the point C of the wing $W_2$ is very rational from the standpoint of rotational balance of the rotor and its mechanical strength and mixing performance and is thus employed in the following studies. In a case where the points B and C are shifted from each other by at least 90°, the interference of the wing $W_2$ with the flow of material along the wing $W_1$ is almost ignorable. It follows that the shearing and mixing actions of the wing $W_1$ can be explained solely by the shape of the wing $W_1$ and conceived of as approximating the mixing and kneading actions of the closed type mixing and kneading apparatus as a whole.

The movements of the material on the wing $W_1$ include a flow (flow rate: $Q_1$) along the length of wing $W_1$ and a flow (flow rate: $Q_2$) past the tip of the wing $W_2$. Further, the flow of material along the length of wing $W_1$ is directed in a direction perpendicular to the axis thereof at a flow rate of $Q'_1$ at the open area of the rotor axially beyond wing $W_1$. Considering as tractive flows between parallel plates constituted by the surface of the rotor and the inner wall of the barrel, the flows of material $Q_1$, $Q_2$ and $Q'_1$, they may be expressed by the following equations:

$$S = \frac{V_o \times BF}{4l_1/\cos\theta_1} \quad (1)$$

in which
S: sectional area of charged material
Vo: volume of mixing chamber
BF: barrel stowage
$l_1$: axial length of longer wing
$\theta_1$: angle wing $\overline{W}$ makes with axis of rotor $$Q_1 = \tfrac{1}{4} Vz \cdot S = \tfrac{1}{4} V \sin\theta_1 \cdot S \quad (2)$$

in which
V: velocity of charged material perpendicular to axis of rotor

Vz: component of V along wing $W_1$ $$Q_2 = \tfrac{1}{4} Vy Hc(l_1/\cos\theta_1) = \tfrac{1}{4} VHcl_1 \quad (3)$$

in which
Hc: tip clearance
Vy: component of V perpendicular to wing $W_1$ $$Q'_1 = \tfrac{1}{4} V \cdot Hc \cdot \alpha L \quad (4)$$

in which
Ho: clearance between rotor body and barrel
$\alpha L$: length of open area between axial end of wing and axial end of rotor In order to escalate the shearing action on the material, the flow rate $Q_2$ is increased, thereby augmenting the quantity of material passing through the tip. For this purpose, the value of $l_1$ is increased since the values of V and Hc are determined by the size of the machine and operating conditions.

Figure 9:
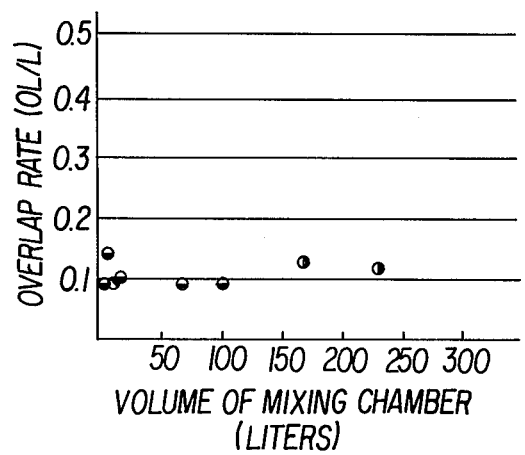
FIG. 9 is a plot of the overlap rate of conventional double-wing rotors.

As shown in FIG. 9, the conventional double-wing rotor has an overlap rate smaller than 0.15, which means that the sum of the lengths of the two wings $(l_1 + l_2)$ is less than 1.15L. Therefore, in order to produce a shearing action higher than that of the conventional double-wing rotor, the values of $l_1$ and $l_2$ are determined such that the sum of the lengths of the two wings is greater than 1.15L, preferably, greater than 1.2L. Namely, the length $l_1$ of one wing has to be greater than $1.2L/2 = 0.6L$.

On the other hand, speaking from the experience of past rubber mixing, the length of one wing should be less than 0.9L in order to prevent burning at the end frame of the mixer. Otherwise, the open wing area would be narrowed to such a degree as to hinder the mixing action. Thus, the lengths $l_1$ and $l_2$ of the two wings should be in the following range.

$$0.6 \leq \frac{l_1}{L} \leq 0.9 \text{ and } 1.2 \leq \frac{l_1 + l_2}{L} \leq 1.8 \quad (5)$$

The increased wing lengths augment the flow rate of the material which is, in the example of FIG. 7, passed from one to the other end of the wing $W_1$ in a direction away from the initial point A, encouraging the mixing action by moving the material through a longer distance in the axial direction.

In order to ensure a sufficient degree of mixing action, it is necessary to move the material smoothly in the axial direction. To this end, the open wing portion should have a length L which does not allow a pressure increase in the open wing portion due to a flow of material parallel to the wing $W_1$ urging the flow of material toward the other wing $W_2$. Namely, it is necessary to satisfy the condition of $$Q_1 \leq Q'_1 \quad (6)$$

By substituting Eqs. (2) and (4) into Eq. (6), we obtain $l_1 = L - \alpha L$ and hence:

$$\frac{\sin 2\theta_1}{\alpha(1-\alpha)} \leq \frac{3 Ho L^2}{Vo \times BF} = C_1$$

where $\alpha$: the ratio of the length of the open area of the rotor to the length of the rotor, and in which $C_i$ is a constant of approximately 5.0 in the double-wing rotor, in consideration of the mechanical dimensions of the mixer body as determined by the mechanical strengths thereof.

Another factor which greatly influences the mixing action is the absolute quantity of $Q_1$. It is known from experience and experiments that, in order to secure a mixing action comparable to or higher than that of the conventional double-wing rotor, it is necessary to have an absolute quantity of $Q_1$ which lets a volume of material $V_1 = S \cdot (l_1/\cos \theta_1)$ on the wing $W_1$ pass through the open wing portion and move onto the other wing $W_2$ in less than four revolutions of the rotor. For this purpose, the condition of the following equation (8) has to be satisfied. Since the time t for one revolution of the rotor is $t = 60/N$ (in which N represents the r.p.m of the rotor), $$V_1 \leq 4t \cdot Q_1 \qquad (8)$$

substituting Eq. (2) into Eq. (8), we obtain $$\frac{\sin 2\theta_1}{1-\alpha} \geq \frac{L}{\pi D} = C_2 \qquad (9)$$

in which $C_2$ is set at approximately 0.5 in consideration of the mechanical strength for a double-wing rotor.

On the other hand, the terminal point B of the wing $W_1$ and the initial point C of the wing $W_2$ should be shifted from each other by at least 90° to preclude mutual interference of the two wings, so that the wing length $l_1$ is limited by the twist angle $\theta_1$. Since the twist angle $\theta_1$ of FIG. 7 is about 26° for a double-wing rotor, the wing length is $$l_1 \cdot \tan \theta_1 \leq R \qquad (10)$$

in a case where $\theta_1 = \theta_0 = 26°$, and as $l_1 = L = \alpha L$ and $R/L = \frac{1}{2}$ (for double-wing rotor), Eq. (10) is written as $$\alpha \geq 1 - \frac{1}{2 \tan \theta_1} \qquad (11)$$

The results of the foregoing study show that the factors which hinder the movements of the material can be removed by forming the wings in the lengths and twist angle satisfying the following conditions (a) to (d), thereby improving the mixing action as compared with the conventional double-wing rotor. In addition, the shearing action can be simultaneously improved by increasing the wing length. The conditions to be met are:

(a) For improving the overlap rate of the wings, $$1.2 \leq \frac{l_1 + l_2}{L} \leq 1.8 \qquad (5)$$

(b) For determining the open shaft portion to secure the axial flow of the material, $$\frac{\sin 2\theta_1}{\alpha(1-\alpha)} \leq \frac{8 \cdot H_o \cdot L^2}{V_o \times BF} = 5.0 \qquad (7)$$

(c) For securing the absolute amount of the flow along the wing, $$\frac{\sin 2\theta_1}{1-\alpha} \leq \frac{L}{\pi D} = 0.5 \qquad (9)$$

(d) For avoiding mutual interference between the two wings to ensure efficient mixing action, $$\alpha \geq 1 - \frac{1}{2 \tan \theta_1} \qquad (10)$$

Figure 10:
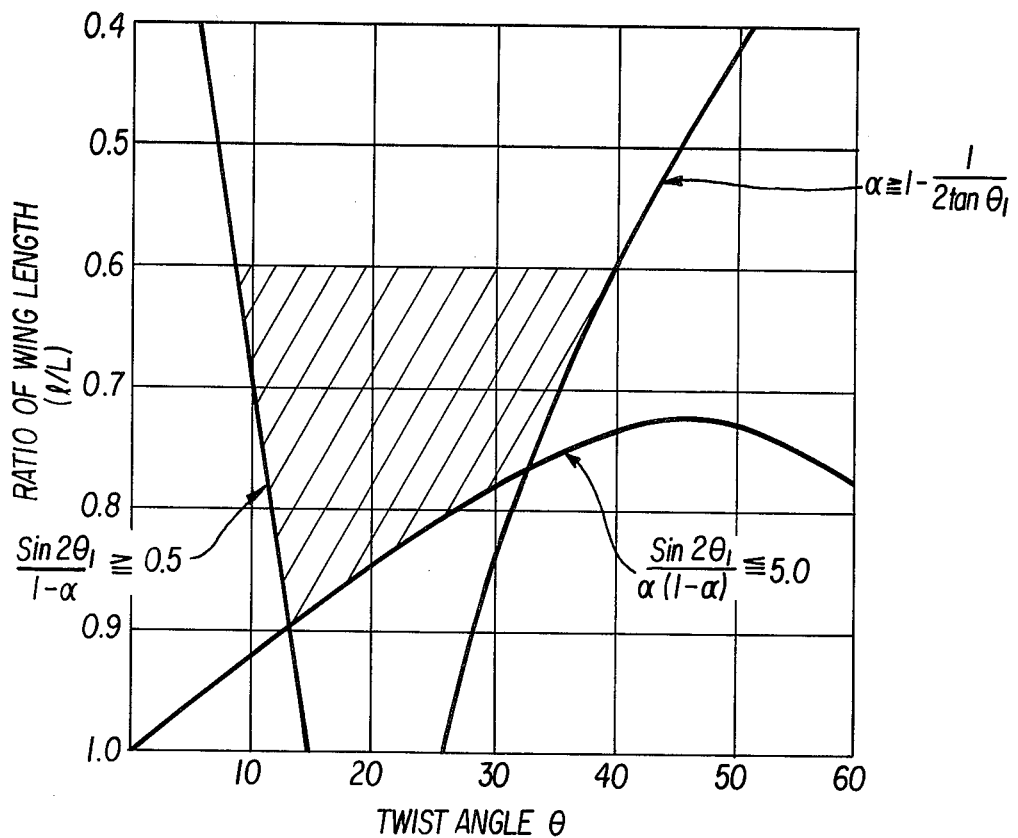
FIG. 10 is a diagram showing the limits in shape and position of the wing according to the present invention.

FIG. 10 diagrammatically illustrates the foregoing conditions, in which the hatched area 11 indicates the range which satisfies all of these conditions. Thus, it suffices that at least one wing has a ratio of wing length l/L of 0.6 to 0.9, a twist angle of 10° to 40° and an overlap rate of 0.2 to 0.8 relative to the other wing. Needless to say, a higher mixing effect is produced in a case where both wings are arranged to have a ratio of wing length of 0.6–0.9 and a twist angle of 10°–40°.

Figure 1:
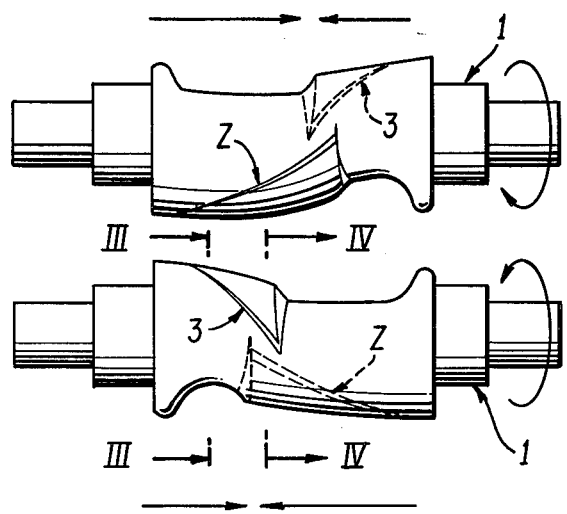
FIG. 1 is a schematic plan view of a conventional double-wing rotor.
Figure 2:
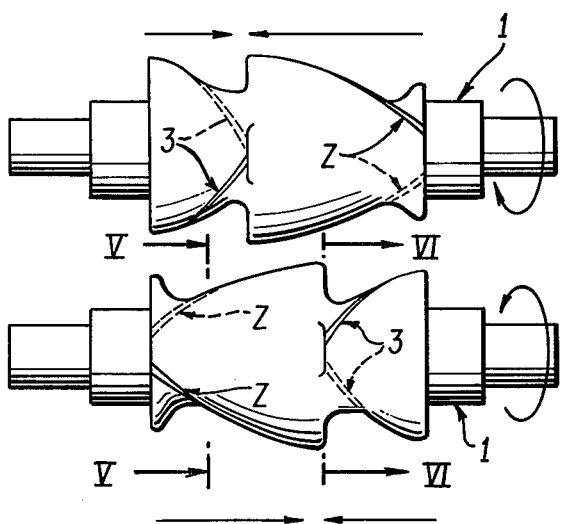
FIG. 2 is a schematic plan view of a conventional four-wing rotor.
Figures 3, 4:
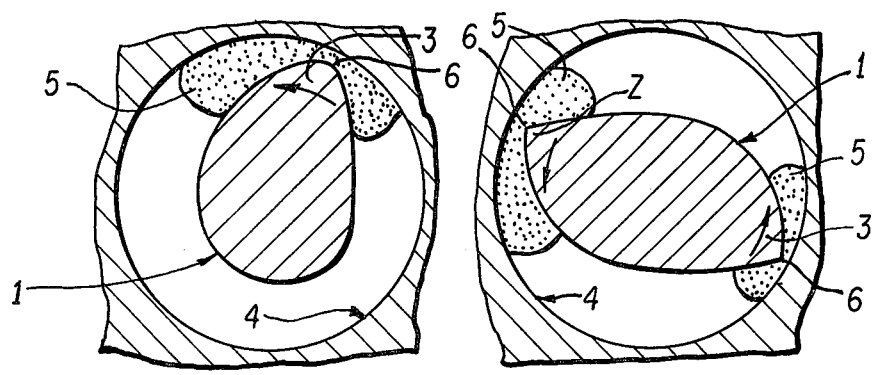
FIGS. 3 and 4 are sectional views respectively taken at line III—III of FIG. 1 and line IV—IV of FIG. 1.
Figures 5, 6:
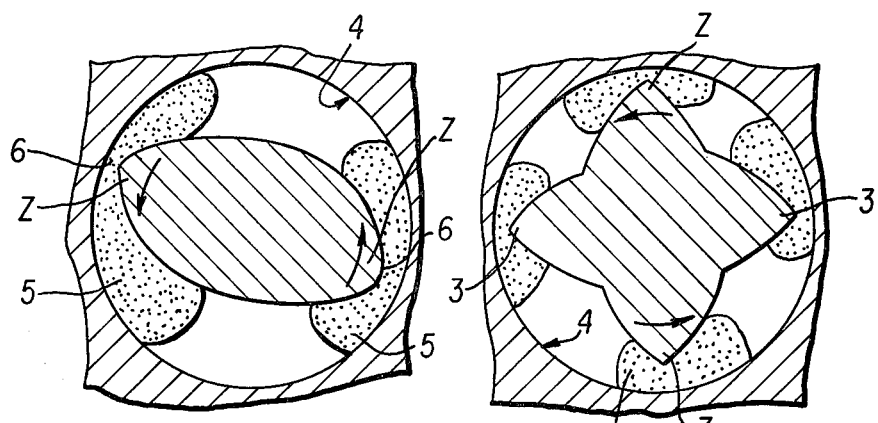
FIGS. 5 and 6 are sectional views respectively taken at lines V—V and VI—VI of FIG. 2.
Figure 15:
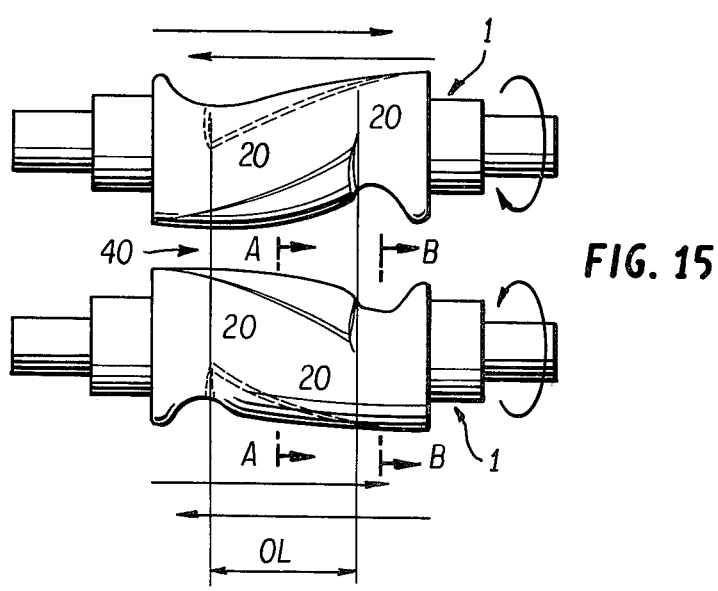
FIG. 15 is a schematic plan view of rotors embodying the present invention.
Figures 11, 12:
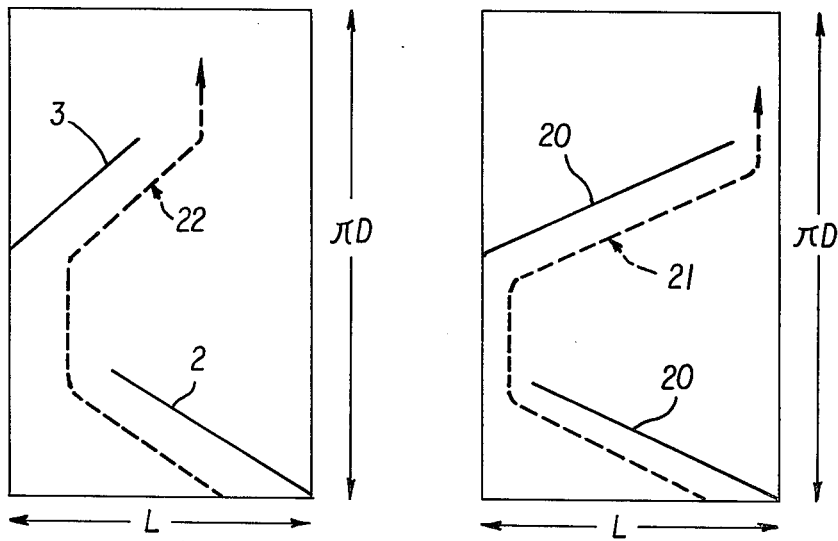
FIG. 11 is a diagram showing the movement of material along the conventional double-wing rotor.
FIG. 12 is a diagram showing the movement of material along the double-wing rotor according to the invention.

FIG. 15 shows in a plan view, rotors according to the present invention which have wings in conformity with the foregoing conditions, with an overlap rate greater than 0.6 to guarantee as high a shearing action as possible. FIG. 12 is a developed view of the wings of the rotors of FIG. 15. In FIG. 15, indicated at 20 is a wing, at 40 an intercommunicating joint portion, and at OL an overlapped portion. The sectional shapes along lines A—A and B—B are similar to FIGS. 4 and 3, respectively. With wings which are overlapped to such a great degree, the material at the open wing portion of one wing is smoothly handed over to the other wing, so that the material is permitted greater movement within the mixing chamber and is subjected to the higher shearing action of the increased length of the wings. In contrast to the flow of material in a conventional double-wing rotor, indicated by broken line 22 in FIG. 11, the rotor of the invention is capable of producing a greater degree of flow of material as indicated by broken line 21 in FIG. 12.

Figure 13:
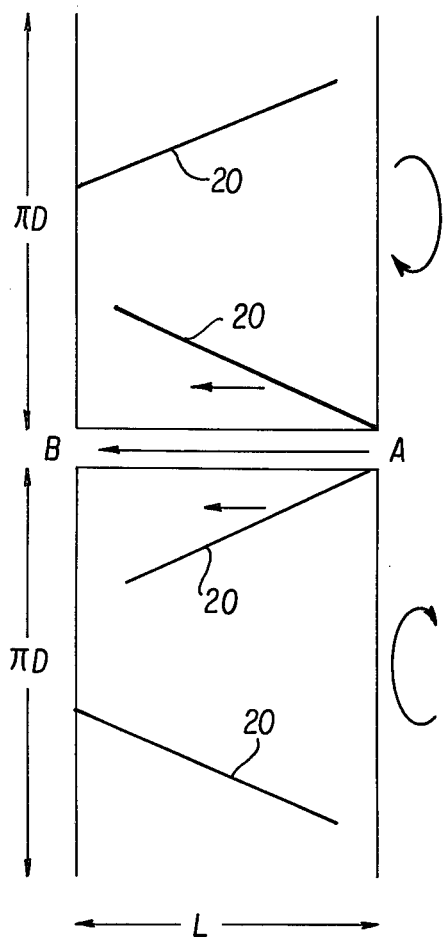
FIGS. 13 and 14 are diagrams showing the movement of material in the intercommunicating barrel portion in the present invention.
Figure 14:
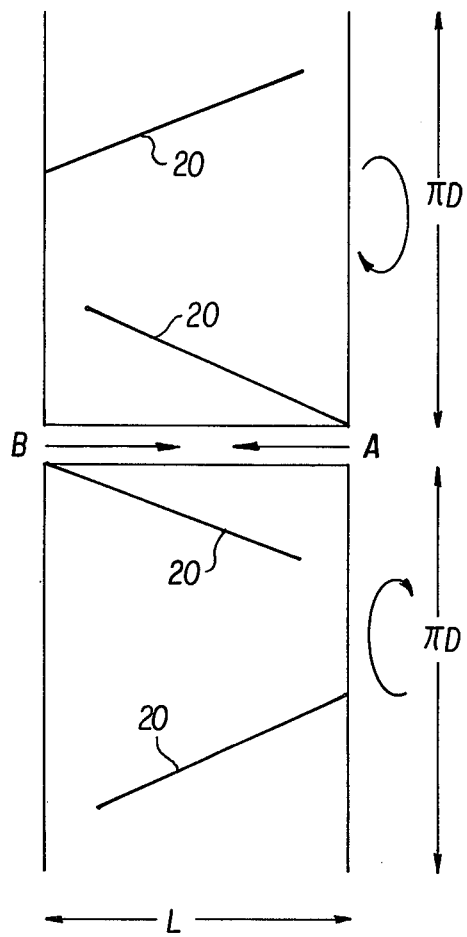

Considering the mutual actions of the two rotors which are rotated at a predetermined speed ratio, a mixing or shearing action is produced in the intercommunicating joint portion between the two mixing chambers according to the rotational positions of the rotors as shown in FIGS. 13 and 14, to a greater degree as compared with the conventional double-wing rotor. More particularly, in the rotational position of FIG. 13, the axial displacements of material by wings $W_1$ are added to each other, the wings $W_1$ of increased length letting the material travel through a longer distance from A to B, to undergo a higher degree of mixing action even in the intercommunicating portion as compared with the conventional rotors. In the position of FIG. 14, the material is squeezed by the wing $W_1$, and the wing $W_2$ of the other rotor, and subjected to a higher compressive shearing action than that of the conventional double-wing rotors since the wings $W_1$ and $W_2$ have increased lengths.

In this manner, a kneader employing the double-wing rotors of the invention has greater mixing and shearing actions than the conventional counterparts not only in the mixing chambers but also in the intermediate joint portion owing to the interactions of the two rotors. Thus, the mixer as a whole has improved mixing and shearing actions or an improved kneading action.

EXAMPLE

A closed type kneading mixer (with a volume of 4.3 liters) with the double-wing rotors according to the invention was used for mastication of natural rubber and for admixing chemicals into a carbon compound (prokneading). The results are shown in Table 1, in comparison with the results obtained from conventional double and four-wing rotors.

TABLE 1

|  | Rotor of this invention | Convention 2-wing rotor | Conventional 4-wing rotor | Remarks |
|---|---|---|---|---|
| Number of wings | 2 | 2 | 4 | |
| Overlap rate | 0.6 | 0.15 | — | |
| Ratio of wing length l/L   Long wing | 0.80 | 0.72 | 0.67 | |
| Ratio of wing length l/L   Short wing | 0.80 | 0.43 | 0.33 | |
| Twist angle ($\theta_1$) | 22° | 34° | 36° | |
| Twist angle ($\theta_2$) | 22° | 55° | 54° | |
| Drop in Mooney viscosity ($\Delta ML$) | 1.30 | 1.00 | 1.35 | A relative value to that of 2-wing rotor, or (1.0) |
| Energy efficiency ($\Delta ML/kwH/kg$) | 1.15 | 1.00 | 1.20 | A relative value to that of 2-wing rotor, or (1.0) |
| Chemicals dispersing ability | 1.00 | 1.00 | 3.00 | A relative value to that of 2-wing rotor, or (1.0) (Smaller, better) |

These results show that the rotor of the present invention has a plasticizing ability (shearing action) equivalent to that of the four-wing rotor, an energy efficiency standing between the conventional double and four-wing rotors, and a chemical dispersing ability equivalent to that of the conventional double-wing rotor. It has been confirmed by experiments that similar effects are obtained from rotors with a ratio of wing length of 0.65-0.85, a twist angle of 15°-35° and an overlap rate of 0.3-0.7 which are especially preferred ranges according to the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A closed type mixing and kneading apparatus having within a mixing chamber a pair of juxtaposed double-wing rotors defining an intercommunicating portion of said chamber therebetween, each one of said rotors having the respective wings thereof twisted to move a charged material inward from one end of said mixing chamber, one of the wings of each rotor having a length ratio of 0.6-0.9 relative to the total length of said rotor and a twist angle of 10°14 40°, said two wings being overlapped by 0.2-0.8 of the total length of said rotor, whereby increased mixing or shearing action is produced in said intercommunicating joint portion.

2. An apparatus as set forth in claim 1, wherein said wings of each of said rotors have a length ratio of 0.65-0.85, a twist angle of 15°-35° and an overlap of 0.3-0.7 of the total length of said rotor.

3. A closed type mixing and kneading apparatus having within a mixing chamber a pair of juxtaposed double-wing rotors defining an intercommunicating portion of said chamber therebetween, each of said rotors having the respective wings thereof twisted to move a charged material inward from one end of said mixing chamber, said wings of each rotor satisfying the following conditions:

$$0.2 \leq \frac{l_1 - l_2}{L} \leq 1.8$$

$$\frac{\sin 2\theta_1}{a(1-a)} \leq \frac{3 \cdot Ho \cdot L^2}{Vo \times BF}$$

$$\frac{\sin 2\theta_1}{1-a} \geq \frac{L}{\tau D}$$

$$a \geq 1 - \frac{1}{\tau \tan \theta_1}$$

in which
l1, l2: axial lengths of the two wings
L: length of the rotors
$\theta_1$: twist angle of the wings
Ho: clearance between the rotor body and barrel
a: ratio of the length of an open wing portion to L
Bo: volume of the mixing chamber
BF: stowage of the material
D: diameter of the barrel,
whereby increased mixing or shearing action is produced in said intercommunicating joint portion.

4. The apparatus of claims 1 or 3 wherein the angular sense of said twist angle of one wing of each rotor of said pair of rotors is opposite the angular sense of said twist angle of the other wing of each rotor of said pair of rotors.

5. The apparatus of claim 4 wherein said rotors are angularly positioned in said mixing chamber such that wings of said pair of rotors having the same angular sense face one another at any rotational angle of said pair of rotors.

6. The apparatus of claim 4 wherein said rotors are angularly positioned in said mixing chamber such that wings of said pair of rotors having the opposite angular sense face one another at any rotational angle of said pair of rotors.

* * * * *